Feb. 11, 1936. L. GOLDBERG 2,030,249
PLANT SUPPORT
Filed March 24, 1934 2 Sheets-Sheet 1
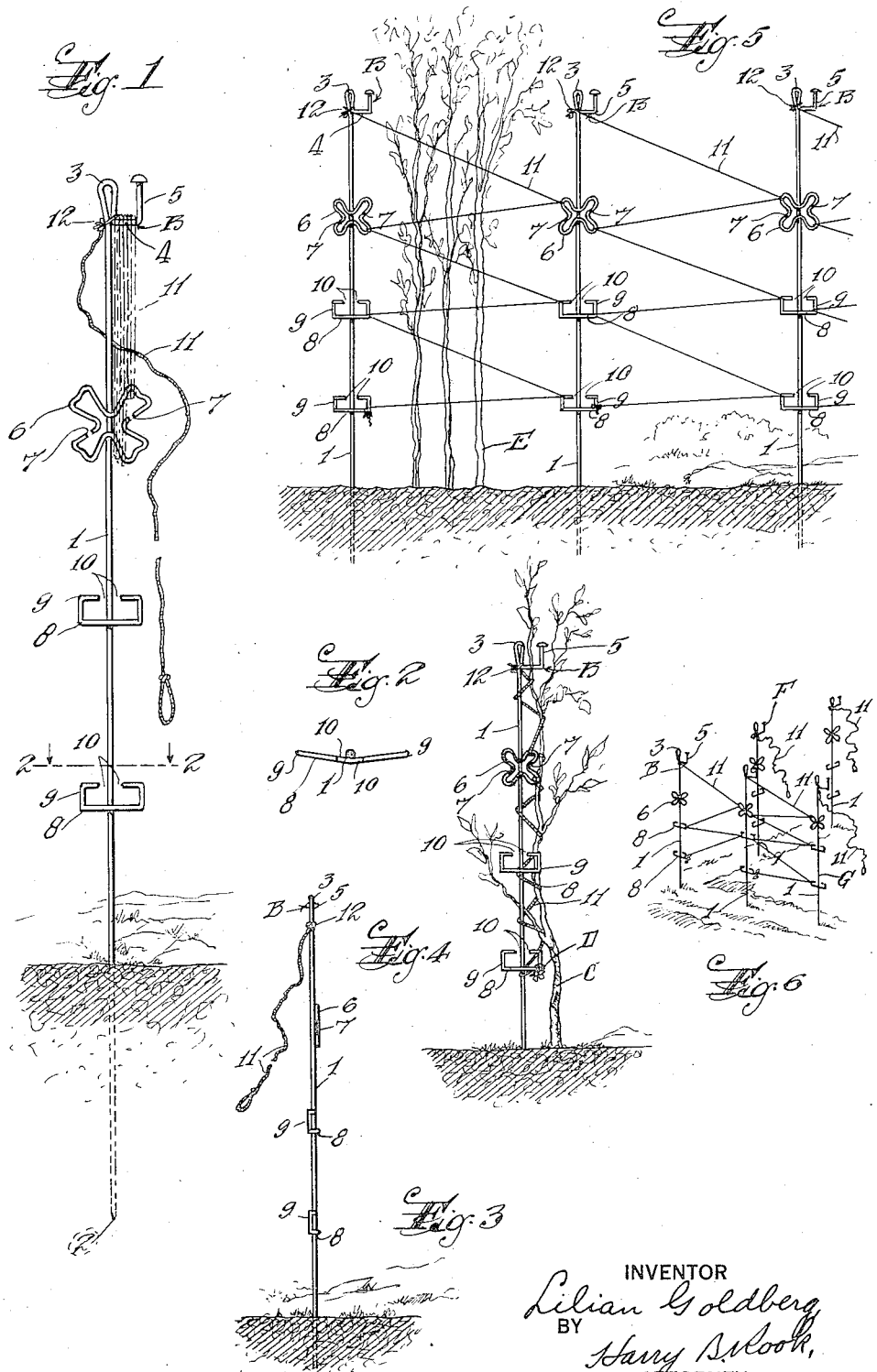
INVENTOR
Lilian Goldberg
BY
Harry B. Cook,
ATTORNEY Feb. 11, 1936.   L. GOLDBERG   2,030,249
PLANT SUPPORT
Filed March 24, 1934   2 Sheets-Sheet 2
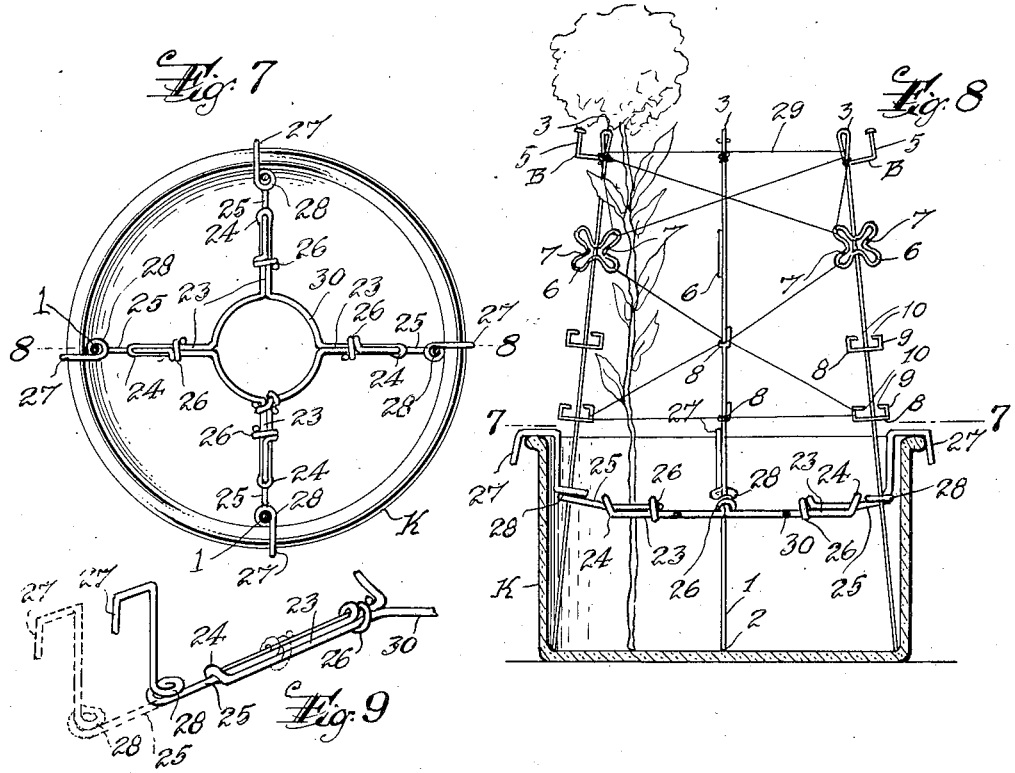
INVENTOR
Lilian Goldberg,
BY
Harry B. Rook,
ATTORNEY Patented Feb. 11, 1936

2,030,249

UNITED STATES PATENT OFFICE 2,030,249

PLANT SUPPORT

Lilian Goldberg, Madison, N. J.

Application March 24, 1934, Serial No. 717,127

4 Claims. (Cl. 47—44)

This invention relates in general to devices for supporting plants in flower or vegetable gardens, pots or greenhouses, and for supporting cut flowers in vases, bowls, or other receptacles, one object of the invention being to provide a novel and improved support of this character which shall be simple and inexpensive in construction, easy and practical to use, pleasing in appearance, and durable so as to withstand repeated use over a long period of time.

Another object is to provide such a plant support comprising a standard to be forced into the earth adjacent the plant, and a flexible strand, such as cord or wire, connected to the standard as shown and described in my Patent No. 2,004,983 dated June 18, 1935, and which shall have a plurality of laterally projecting hooked arms or open loops spaced longitudinally of the standard and having lateral openings to permit said strand to be inserted laterally into the arms or loops to hold the strands against accidental displacement, so that said flexible strand can be wrapped around the stem or trunk of a plant and easily and quickly connected to or laced through one or more of said loops or hooked arms to support the plant in upright position, or a plurality of said supports can be driven into the ground in spaced relation to each other and the flexible strands of the supports can be easily and quickly laced through or connected to the loops or hooked arms of adjacent supports to form in effect a fence or elongated vertical support for a plurality of plants in a cluster or row.

Further objects are to provide a novel and improved support for cut flowers in a bowl, vase or like receptacle, which shall include such supports and flexible strands, whereby the stems of the flowers shall be supported at a plurality of points spaced longitudinally of the stems; to provide a cut flower support of the character described which shall be adjustable for mounting on bases, bowls or like receptacles of different sizes; and to obtain other advantages and results as will be brought out by the following description.

Referring to the accompanying drawings in which corresponding and like parts are designated throughout the several views by the same reference characters, Figure 1 is a side elevation of a plant support embodying my invention.

Figure 2 is a horizontal sectional view on the line 2—2 of Figure 1.

Figure 3 is a side elevation of the support on a reduced scale.

Figure 4 is a front elevation of the support showing it as supporting a single plant.

Figure 5 is a front elevation of a plurality of the supports arranged in spaced relation in a row to form an elongated support or fence for supporting a plurality of plants in a row.

Figure 6 is a perspective view on a reduced scale of a plurality of the supports arranged to provide two right angularly disposed fences.

Figure 7 is a top plan view of another form of support for use with cut flowers in a shallow bowl.

Figure 8 is a vertical sectional view on the line 8—8 of Figure 7.

Figure 9 is a fragmentary perspective view showing the manner of adjusting the arms of the support to accommodate receptacles of different diameters.

Specifically describing the embodiment of the invention shown in Figures 1 to 6 inclusive, the plant support includes a standard 1 formed of suitable material, preferably stiff wire. One end of the standard is preferably pointed at 2 to be driven into the ground, and obviously, the standard will be made of such dimensions and strength to serve as an effectual support for a plant or a plurality of plants as the case may be. The other end of the standard has a hooked projection B which is formed by bending or returning the end portion of the standard inwardly upon itself as at 3, then bending the end portion laterally as at 4 and then finally bending the extremity of the standard to form a portion 5 extending approximately parallel to the standard and in the direction of said end.

Intermediate its ends the standard is formed with a plurality of open loops or hooked projections which are spaced longitudinally of the standard and project laterally therefrom. These open loops or hooked arms may be of any suitable configuration, but are such that a flexible strand can be threaded laterally through the loop or into the hook, and the loops or arms will prevent accidental lateral displacement of the strand therefrom. As shown on the drawings one loop is approximately in the form of a four-leaf clover as indicated at 6, being made preferably of wire and secured to the standard in any suitable manner as by welding. At spaced points, the loop has lateral restricted openings 7 of a width slightly greater than the diameter of the strand to permit passage of the flexible strand therethrough laterally of the loop so that the strand can be easily and quickly inserted into the loop. As shown, there are in effect four loops formed of two pieces of wire secured intermediate their ends to the standard with their extremities spaced apart to form the openings 7.

Another form of the open loop or hooked arm is shown at 8 and comprises a single length of wire secured intermediate its ends upon the standard and having its end portions formed into hooks 9 with their extremities spaced from the standard distances to permit free slipping of the flexible strand between said extremities and the standard, as indicated at 10.

The reference character 11 designates a flexible strand of suitable material, for example cord, which may have one end connected at 12 to the hooked projection B with the other portion of the cord free for threading through the various loops 6 and 8.

One use of the support is shown in Figure 4 of the drawings where the standard 1 is driven into the ground adjacent a plant C and the flexible strand 11 is wound around the stem of the plant and threaded through the various loops 6 and 8 so as to firmly attach the plant to the support. Where desired, the end of the strand opposite the hooked projection B may be tied to one of the loops as indicated at D. It will be observed that the intermediate portions of the flexible strand can be easily connected to or threaded through the loops 6 and 8 by simply passing the strand laterally of the loops through the openings 7 and 10 and the other portions of the loops will prevent accidental lateral displacement of the strand from the loops. The strand may be unwound from the plant and standard by simply drawing the strand out of the openings 7 and 10 of the loops, and when it is desired to place the standard out of use the strand may be wound over the hooked projection B and on one of the loops as shown by dot and dash lines in Figure 1. The strand is thereby held against detachment from the standard and is prevented from becoming entangled or knotted.

Another use of the standard is shown in Figure 5 where a plurality of the standards are arranged in spaced relation in a row and the flexible strand of each standard is laced through the loops of adjacent standards and its own loops to form in effect an elongated support or fence which may be used for supporting a row of plants E. The standards effectually support the strands like the posts of a fence, and the strands serve to hold the plants in upright position.

A similar use of the invention is shown in Figure 6 where a plurality of the standards are arranged to provide two fence-like portions F and G at right angles. This use of the invention is particularly adapted for the corner of a garden.

Figures 7 and 8 show another form of support particularly adapted for supporting long-stemmed flowers in a bowl, and the support is adjustable to use with bowls of different diameters. The support comprises a frame formed of a single piece of wire looped upon itself to provide radial arms 23 each of which has at its extremity an eye 24. Through each eye 24 is slidable an extension 25 which has one end coiled at 26 about the corresponding arm 23 and the other end formed with a hook 27 to take over the edge of a bowl K. The eye 24 and the coil 26 serve as guides for the sliding motion of the extensions 25 on the arm 23, and obviously by sliding the extensions the hooks may be adjusted to take over the edges of bowls of different diameters as shown in Figure 9. Each extension 25 may have an eye 28 through which a standard like that shown in Figure 1 but of small size, may be inserted so as to be supported in upright position by the eye 28 and the bottom and side walls of the bowl. Flexible strands 29 may be threaded around and secured to the standards so as to form a support for long-stemmed flowers.

While I have shown and described several forms of my invention embodied in certain details of construction, it should be understood that this is primarily for the purpose of illustrating the principles of the invention and that the invention may be made in other forms and with different details of construction without departing from the spirit or scope of the invention.

Having thus described my invention, what I claim is:

1. A plant support comprising a frame having radial arms provided with hooks to hang over the edge of a receptacle for supporting the frame in such receptacle, said frame having a plurality of eyes, and standards inserted through said eyes with their lower ends to rest on the bottom of the receptacle and having rests at their upper ends for flower stems.

2. A plant support comprising a frame having radial arms provided with hooks to hang over the edge of a receptacle for supporting the frame in such receptacle, said frame having a plurality of eyes, and standards inserted through said eyes with their lower ends to rest on the bottom of the receptacle and having hooked arms intermediate their ends, and flexible stands connected to the hooked arms of adjacent standards to support flowers in said receptacle.

3. The plant support set forth in claim 1 wherein each of said radial arms is formed of relatively slidable sections to adjust the position of said hooks to accommodate receptacles of different diameters.

4. A plant stem support including a standard to be erected adjacent the plant stem and formed of a length of wire, said standard having its upper end rebent on itself and then extending laterally and upwardly to form an upwardly opening loop, said standard having attached thereto intermediate its ends at least one strand support in the form of a four leaf clover loop having restricted oppositely disposed openings near the inwardly extending portions of the loop, to receive a flexible strand laterally engageable through said restricted openings with the desired portions of said loop.

LILIAN GOLDBERG.